United States Patent
Groth et al.

(10) Patent No.: US 8,204,233 B2
(45) Date of Patent: Jun. 19, 2012

(54) ADMINISTRATION OF DATA ENCRYPTION IN ENTERPRISE COMPUTER SYSTEMS

(75) Inventors: Noah Groth, San Rafael, CA (US); Krassimir Boyadjiev, Novato, CA (US)

(73) Assignee: Symantec Corporation, Cupertino, CA (US)

( * ) Notice: Subject to any disclaimer, the term of this patent is extended or adjusted under 35 U.S.C. 154(b) by 1156 days.

(21) Appl. No.: 11/423,405

(22) Filed: Jun. 9, 2006

(65) Prior Publication Data

US 2007/0022285 A1     Jan. 25, 2007

Related U.S. Application Data

(60) Provisional application No. 60/701,811, filed on Jul. 21, 2005, provisional application No. 60/708,801, filed on Aug. 15, 2005.

(51) Int. Cl.
*H04L 29/06* (2006.01)
(52) U.S. Cl. .......... 380/286; 713/193
(58) Field of Classification Search .......... 713/168–181, 713/193; 726/2–21, 27–30; 380/283
See application file for complete search history.

(56) References Cited

U.S. PATENT DOCUMENTS

| 5,802,175 | A | 9/1998 | Kara |
| 6,098,056 | A | 8/2000 | Rusnak et al. |
| 6,141,423 | A | 10/2000 | Fischer |
| 6,189,100 | B1 * | 2/2001 | Barr et al. ............ 713/182 |
| 6,272,632 | B1 | 8/2001 | Carman et al. |
| 6,754,829 | B1 * | 6/2004 | Butt et al. ............ 726/8 |
| 7,170,999 | B1 * | 1/2007 | Kessler et al. ............ 380/277 |
| 7,308,717 | B2 * | 12/2007 | Koved et al. ............ 726/27 |
| 2002/0016831 | A1 | 2/2002 | Peled et al. |
| 2002/0159601 | A1 * | 10/2002 | Bushmitch et al. ............ 380/277 |
| 2005/0114520 | A1 * | 5/2005 | White et al. ............ 709/228 |
| 2005/0114686 | A1 | 5/2005 | Ball et al. |
| 2008/0040609 | A1 * | 2/2008 | Giobbi ............ 713/182 |

FOREIGN PATENT DOCUMENTS

| WO | WO 01/90855 | 11/2001 |
| WO | WO 01/90859 | 11/2001 |

OTHER PUBLICATIONS

International Search Report dated Aug. 16, 2007 in corresponding Application No. PCT/US2006/023052.
International Search Report dated Oct. 19, 2007 in corresponding Application No. PCT/US2006/023052.
Written Opinion dated Oct. 19, 2007 in corresponding Application No. PCT/US2006/023052.
Examination Report dated Mar. 23, 2009 in EP Application No. 06849793.2.
European Examination Report, European Application No. 06849793.2, Dec. 28, 2010, 4 pages.

* cited by examiner

*Primary Examiner* — Gilberto Barron, Jr.
*Assistant Examiner* — Virginia T Ho
(74) *Attorney, Agent, or Firm* — Fenwick & West LLP

(57) ABSTRACT

Encrypting data on an originating computer and prevent access to this data if the computer is stolen or otherwise unauthorized for use. Access to the encrypted data is granted based on the originating computer's ability to successfully send the data encryption keys, via an electronic connection, to a remote computer and have the remote computer decrypt the encryption keys and transmit them back to the he originating computer. When originating computer receives the decrypt encryption keys, it can then successfully decrypt the encrypted hard drive using the encryption key provided by the remote computer.

27 Claims, 9 Drawing Sheets

ADMINISTRATION OF DATA ENCRYPTION IN ENTERPRISE COMPUTER SYSTEMS

CROSS REFERENCE TO RELATED APPLICATIONS

This patent application takes priority under 35 U.S.C. 119 (e) to (i) U.S. Provisional Patent Application No. 60/701,811, filed on Jul. 21, 2005 entitled "ADMINISTRATION OF DATA ENCRYPTION IN ENTERPRISE COMPUTER SYSTEMS" by Groth and (ii) U.S. Provisional Patent Application No. 60/708,801, filed on Aug. 15, 2005 entitled "ADMINISTRATION OF DATA ENCRYPTION IN ENTERPRISE COMPUTER SYSTEMS" by Groth each of which is incorporated by reference in their entireties for all purposes.

BACKGROUND

1. Field of the Invention

This invention relates to enterprise computing systems and the administration of data encryption particularly with mobile computing and removable storage devices. In particular the invention provides protection for and the administration of computers whose hard disks are encrypted using sector level encryption.

2. Description of Related Art

Currently, enterprise computing systems have been faced with the challenge of having to use multiple point solutions to encrypt email, files, folders, full hard drives, removable storage devices and PDAs. Unfortunately, however, multiple point solutions by their very nature are managed separately resulting in high installation and maintenance costs. In some cases, these costs forced an organization to chose to protect data on only a handful of "key" computers or to protect no data at all and "hope for the best".

Regulatory requirements and laws are forcing companies to pay more attention to protecting their data. In particular, customer and consumer information that is entrusted to organizations is at high risk because of the liability to the organization associated with identity theft of consumer information. In order to mitigate this risk, organizations are implementing solutions to protect against unauthorized access to data.

The proliferation of mobile and removable storage devices is creating new security concerns for enterprises due to the sensitive information they contain and their increased vulnerability to theft and loss. Even though the total cost for protective measures such as encryption is less than the damage of even one incident involving the theft or loss of unencrypted data, a majority of these devices are not adequately protected.

Therefore, what is required is an easily applied and cost-effective control of digital assets that ensures regulatory compliance, protects information confidentiality and increases the productivity of a mobile and outsourced workforce.

SUMMARY OF THE INVENTION

The invention describes encrypting data on an originating computer and prevent access to this data if the computer is stolen. Access to the encrypted data is granted based on the originating computer's ability to successfully send the data encryption keys, via an electronic connection, to a remote computer and have the remote computer decrypt the encryption keys and transmit them back to the originating computer. When originating computer receives the decrypted encryption keys it can then successfully decrypt the encrypted hard drive using the encryption key provided by the remote computer. A number of embodiments are further described.

In one embodiment, a method of remotely administering data encryption in a computing system having an authentication server and at least one client computer having a data storage device suitably arranged for storing encrypted data is described. The method is carried out by determining if the client computer on which the encrypted data is stored is an authorized client computer and if the client computer is authorized, then passing an encrypted data storage key from the client computer to the authentication server. The encrypted data storage key is then decrypted by the authentication server that is then passed to the client computer. The client computer in turn, uses the decryption key to access the encrypted data on the data storage device.

In another embodiment, an apparatus for remotely administering data encryption in a computing system having an authentication server and at least one client computer having a data storage device suitably arranged for storing encrypted data is described. The apparatus includes means for determining if the client computer on which the encrypted data is stored is an authorized client computer, means for passing an encrypted data storage key from the client computer to the authentication server if the client computer is authorized, means for decrypting the encrypted data storage key by the authentication server, means for passing the decrypted data storage key to the client computer, and means for using the decryption key to access the encrypted data on the data storage device.

In yet another embodiment, computer program product executable by a processor for remotely administering data encryption in a computing system having an authentication server and at least one client computer having a data storage device suitably arranged for storing encrypted data is described. The computer program product includes computer code for determining if the client computer on which the encrypted data is stored is an authorized client computer, computer code for passing an encrypted data storage key from the client computer to the authentication server if the client computer is authorized, computer code for decrypting the encrypted data storage key by the authentication server, computer code for passing the decrypted data storage key to the client computer, computer code for using the decryption key to access the encrypted data on the data storage device, and computer readable medium for storing the computer code.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings.

DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The proliferation of mobile and removable storage devices is creating new security concerns for enterprises due to the sensitive information they contain and their increased vulnerability to theft and loss. Even though the total cost for protective measures such as encryption is less than the damage of even one incident involving the theft or loss of unencrypted data, a majority of these devices are not adequately protected. Accordingly, this invention enables a client computer whose hard disk is encrypted using sector level disk encryption to securely obtain from an authentication server an appropriate hard disk encryption key. In the described embodiments, public private key technology is used to ensure the safe storage and transport of encryption keys. Therefore, this invention provides a solution that encrypts data and protects against unauthorized access to data on a computer if the computer cannot establish communication with a remote computer and obtain the encryption keys it needs to decrypt the data on the computer. For example, if a computer is stolen, the stolen computer will not be able to obtain the encryption keys from the remote computer and the data on the stolen computer will remain encrypted.

This invention will encrypt data on an originating computer and will prevent access to this data if the computer is stolen. Access to the encrypted data is granted based on the originating computer's ability to successful send the data encryption keys, via an electronic connection, to a remote computer and have the remote computer decrypt the encryption keys and transmit them back to the he originating computer. When originating computer receives the decrypted encryption keys it can then successfully decrypt the encrypted hard drive using the encryption key provided by the remote computer.

In this way, the invention allows a user to encrypt individual files or the entire hard disk on an originating computer using encryption keys created on the originating computer. These encryption keys will be encrypted with the remote computer public key and the encrypted result saved to permanent local storage on the originating computer or on a local storage device. Once the data is encrypted and saved, the encryption keys cannot be decrypted unless the remote computer decrypts the encryption keys.

Figure 1:
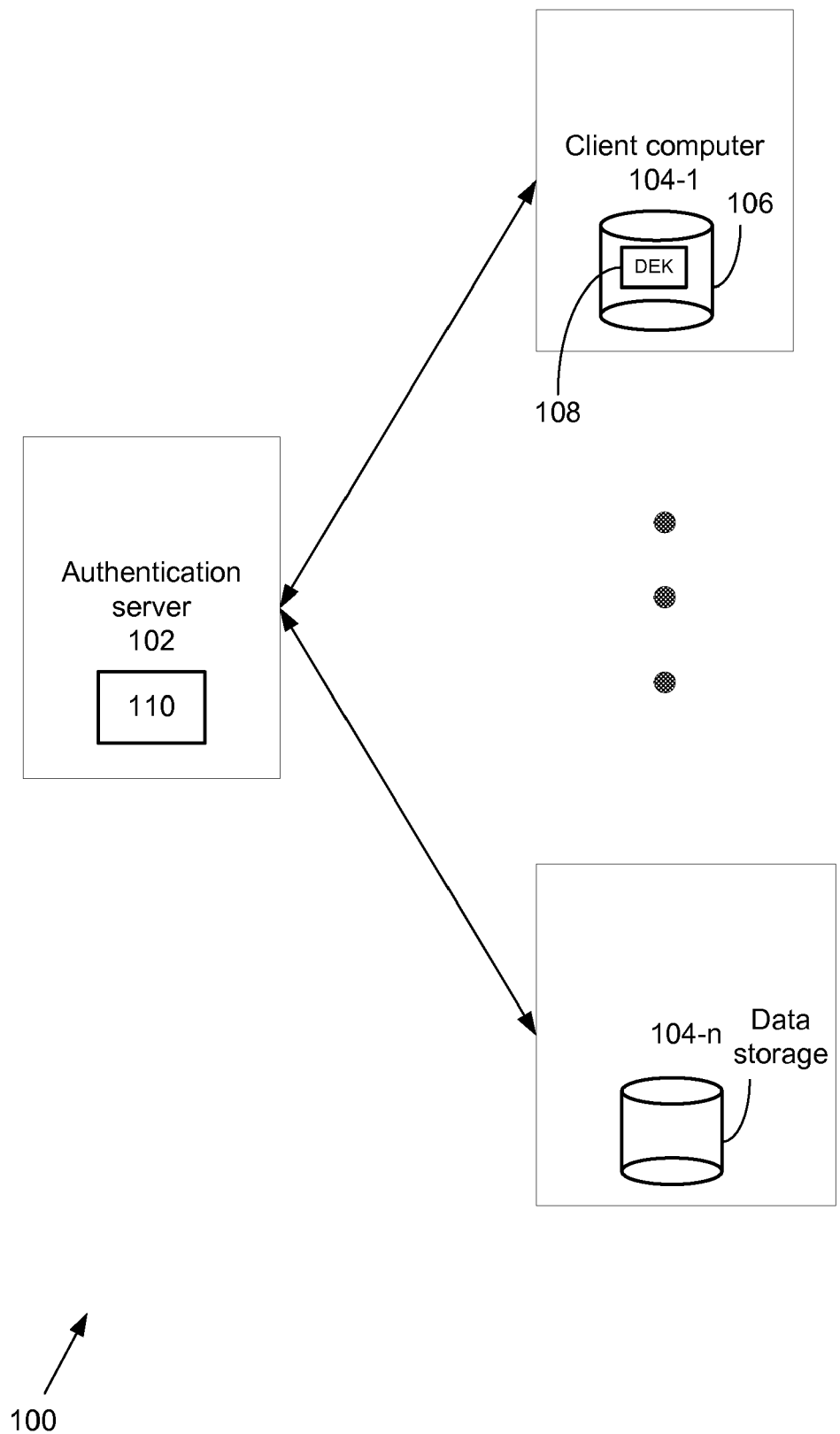
FIG. 1 shows a computing system in accordance with an embodiment of the invention that includes an authentication server that communicates with a number of client computers each having an encryptable hard disk or other such data storage device.

FIG. 1 shows a computing system 100 in accordance with an embodiment of the invention that includes an authentication server 102 that communicates with a number of client computers 104 each having an encryptable hard disk or other such data storage device. A client computer can be any computer that can communicate with the authentication server 102 and therefore it is contemplated that any number of client computers 104 can be suitably linked to the authentication server 102 to form the computing system 100. In the described embodiment, a representative client computer 104-1 includes a hard disk 106 (or any other appropriate storage device) that is encrypted with a full disk encryption protocol having its own unique encryption key referred to as a disk encryption key (DEK) 108. Therefore, in order for any encrypted data stored on a hard disk 106 to be decrypted, the client computer 104-1 must have access to the DEK 108. Accordingly, the authentication server 102 provides a DEK decryption service for any approved client computer (such as the client computer 104-1) using authentication software 110 executed by a processor coupled to or included in the authentication server 102.

Figure 2:
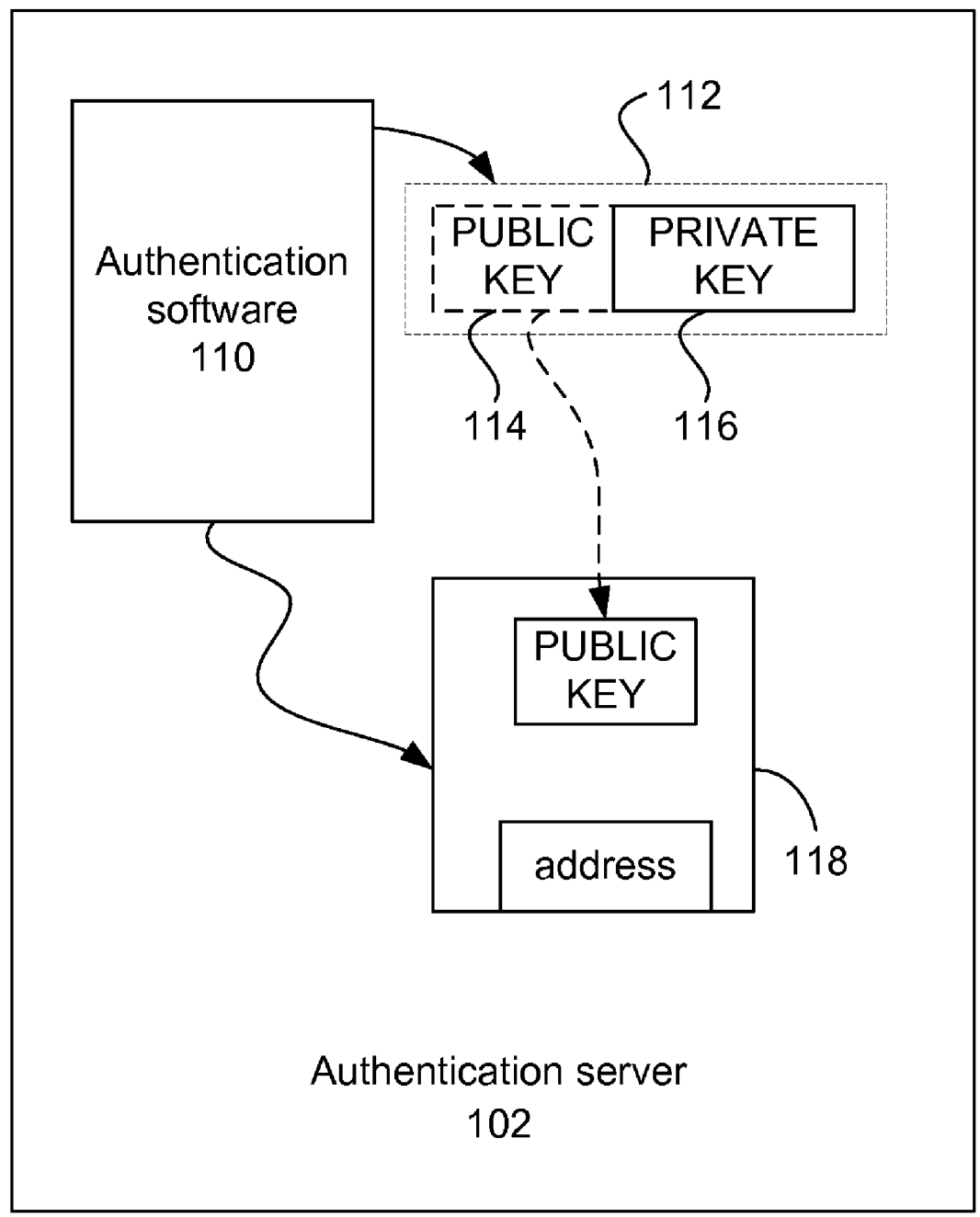
FIGS. 2-5 illustrate a system for administering data encryption on a client computer in accordance with an embodiment of the invention.
Figure 3:
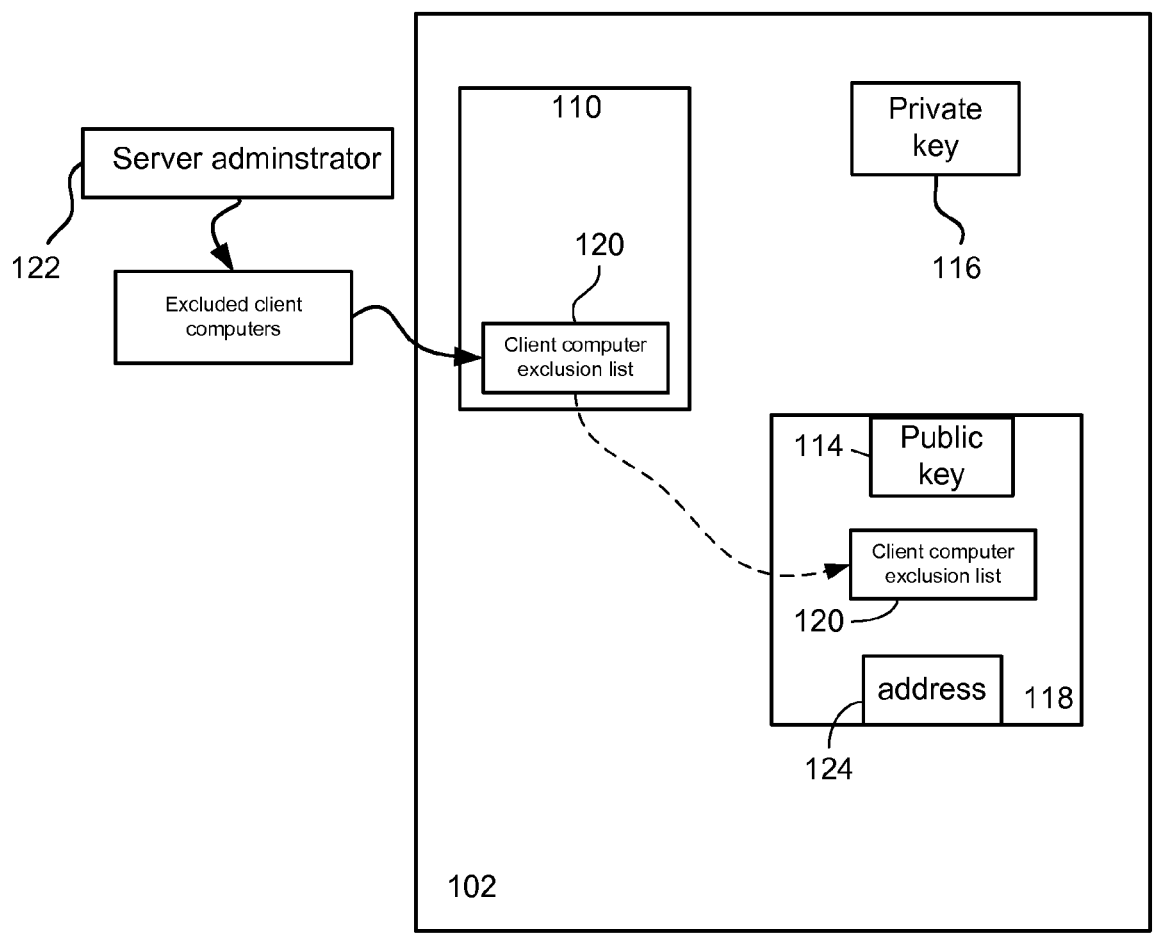

FIG. 2 illustrates an embodiment of the authentication server 102 that provides a secure environment for the computer system 100 that protects against unauthorized access to encrypted data on the computer if the computer cannot establish communication with a remote computer and obtain the required encryption keys. Once installed on the authentication server 102, the authentication software 110 creates a private key/public key pair (PPK) 112 having a public key portion 114 and a private key portion 116. During the installation of a communication program 118 (that enables secure communication between any of a number of the client computers 104 and the authentication server 102) the public key 114 is embedded therein while the private key portion 116 remains on the authentication server 102 as shown in FIG. 3.

In one embodiment, a client computer exclusion list 120 provides identification of those client computers that are denied access to the authentication process. The excluded computer option allows, for example, an administrator 122 of the authentication server 102 to enter the name(s), or other identifiers, of those computers that will not be processed by the authentication server 102. Such a list can be created by, for example, the server administrator 122 and loaded onto the authentication server 102 that is subsequently embedded into the communication program 118 along with a network address of the authentication server 102. Alternatively, rather than listing excluded computers, the connection to the authentication server 102 can be controlled by requiring that the client computer 104 must be inside a firewall. In this way, any client computer 104 inside the firewall could access the authentication server 102, but they could not access if outside the firewall.

Figure 4:
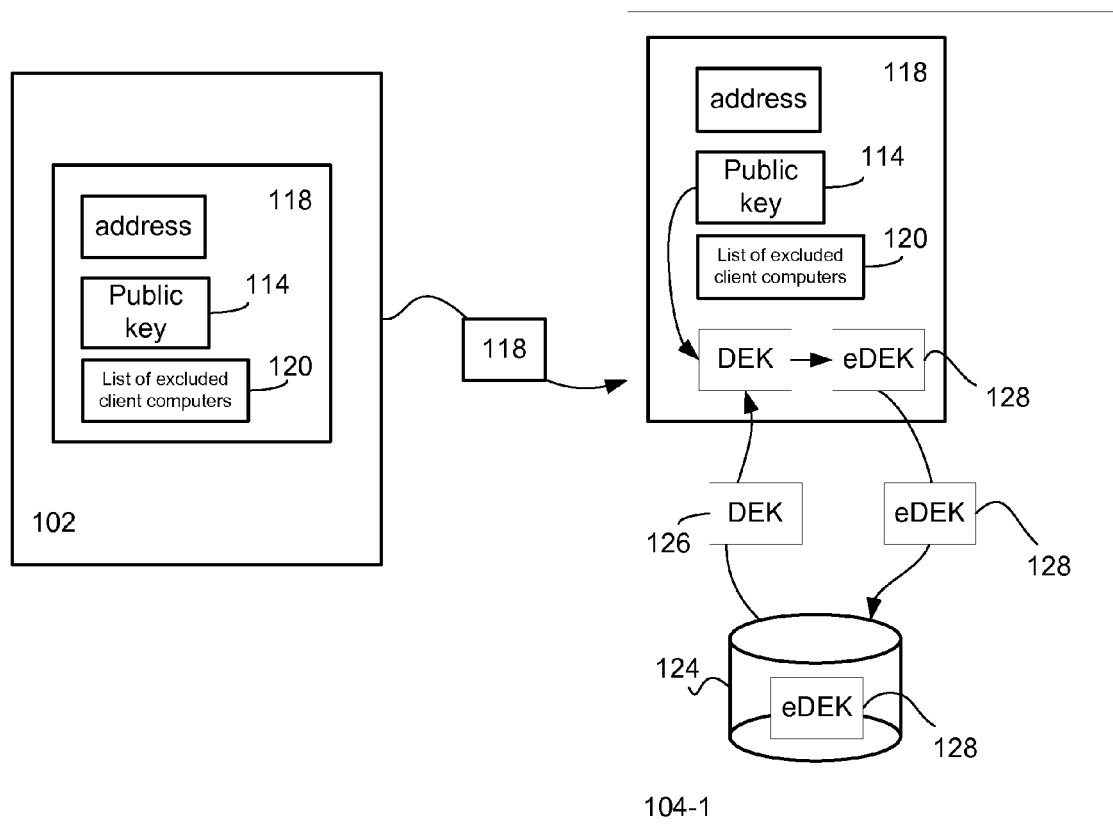

Once the communication program 118 has been fully configured, the authentication server 102 will distribute the communication program 118 to those of the client computers 104 having a hard disk 124 encrypted using sector level disk encryption as illustrated in FIG. 4 (such as client computer 104-1). It should be noted that sector level disk encryption encrypts a hard disk (or other storage media) at the sector level of the disk. Once received at the client computer 104-1, the client communication program 118 will install itself on the computer 104-1 so that when the computer 104-1 is booted, the client communication program 118 will execute very early in the client boot process. However, while the communication program 118 is being installed, the disk encryption key (DEK) 108 is obtained from a corresponding sector level disk encryption program (not shown). Once obtained, the client communication program 118 will encrypt the DEK 108 with the public key 114 provided by the authentication server 102 (that was previously embedded in the client communication program 118) to form an encrypted disk encryption key eDEK 128 which will then be stored on the encrypted hard disk 124 or to permanent local storage on the client computer 104-1 or on a local storage device. Once the data is encrypted and saved, the encryption keys cannot be decrypted unless the authentication server 102 and the client computer 104-1 are in communication with each other.

Figure 5:
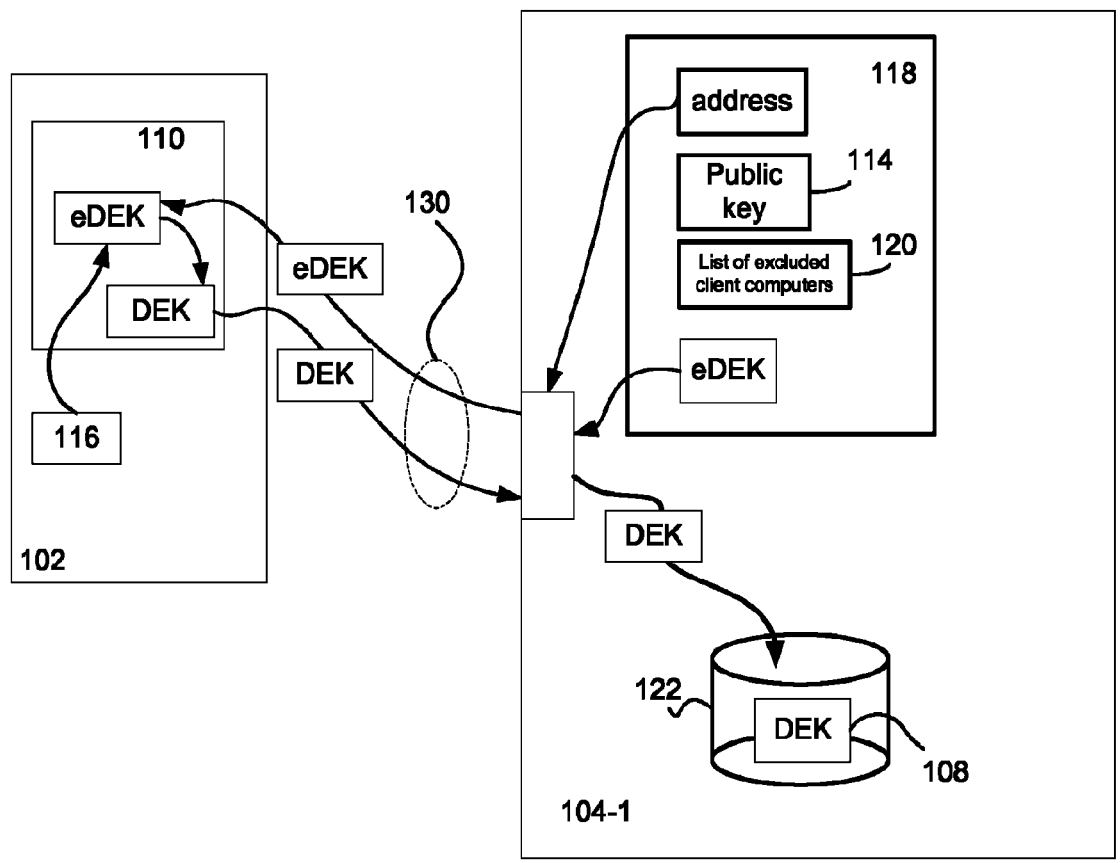

Referring to FIG. 5, when the client communication program 118 is executed (during, for example, a boot procedure), it will attempt to establish a communication link 130 in order to securely communicate with authentication server 102 using the network address (or domain) that was previously embedded in the client communication program 118. If the communication link 130 cannot be established, the client computer 104-1 will not be able to decrypt the encryption keys and the encrypted data on the client computer 104-1 cannot be accessed since the data cannot be decrypted. Furthermore, the client computer 104-1 will display a message that indicating that the client computer 104-1 cannot be started until communication with the authentication server 102 can be established. If, however, communication can be established with the authentication server 102 by way of the communication link 130, the client communication program 118 will then transmit to the authentication server 102 the encrypted eDEK 128 along with the name of the name, or other identifier of the client computer 104-1.

Upon receiving the data from the client computer 104-1, the authentication server 102 will determine if the computer name for the client computer 104-1 is listed on the computer exclusion list 120. If the computer 104-1 is on the computer exclusion list 120, the authentication server 102 will send a message to the client computer 104-1 that the authentication server 102 cannot decrypt the encrypted key eDEK 128 for the client computer 104-1. If, however, the client computer 104-1 is not on the computer exclusion list 120, the authentication server 102 will use the private key 116 to decrypt the eDEK 128 (heretofore encrypted with the public key 114). The authentication server 102 will then securely transmit the (now decrypted) DEK 108 to the client computer 104-1. When the client computer 104-1 receives the DEK 108, the client computer 104-1 will pass control of the boot process and the DEK 108 to the disk encryption program. The disk encryption program will use the DEK 108 to begin decrypting data on the disk 124 and continue the normal computer boot process. From this point and afterward the client computer 104-1 will have a normal boot process.

Figure 6:
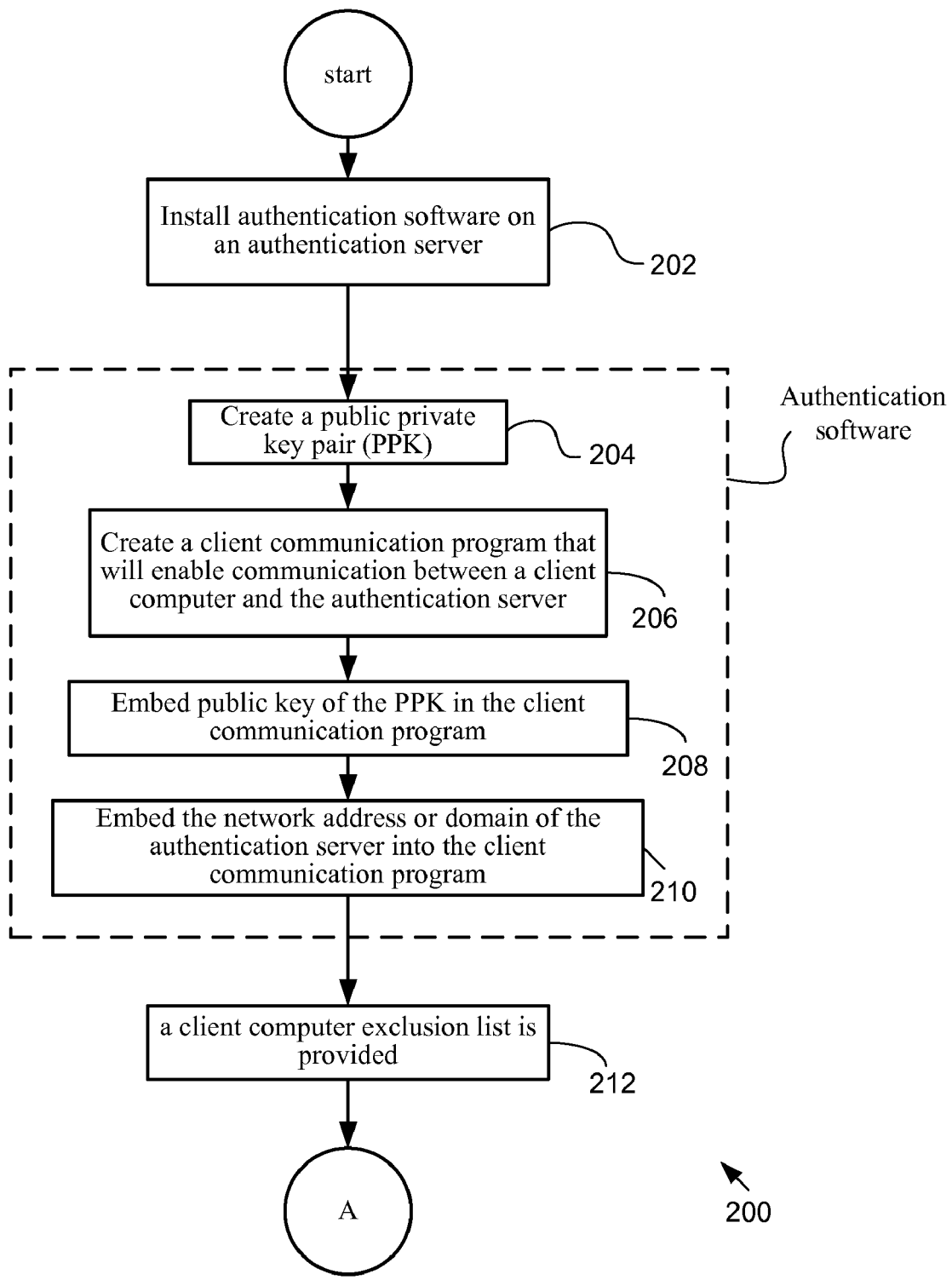
FIGS. 6-8 illustrate a process in accordance with an embodiment of the invention.
Figure 7:
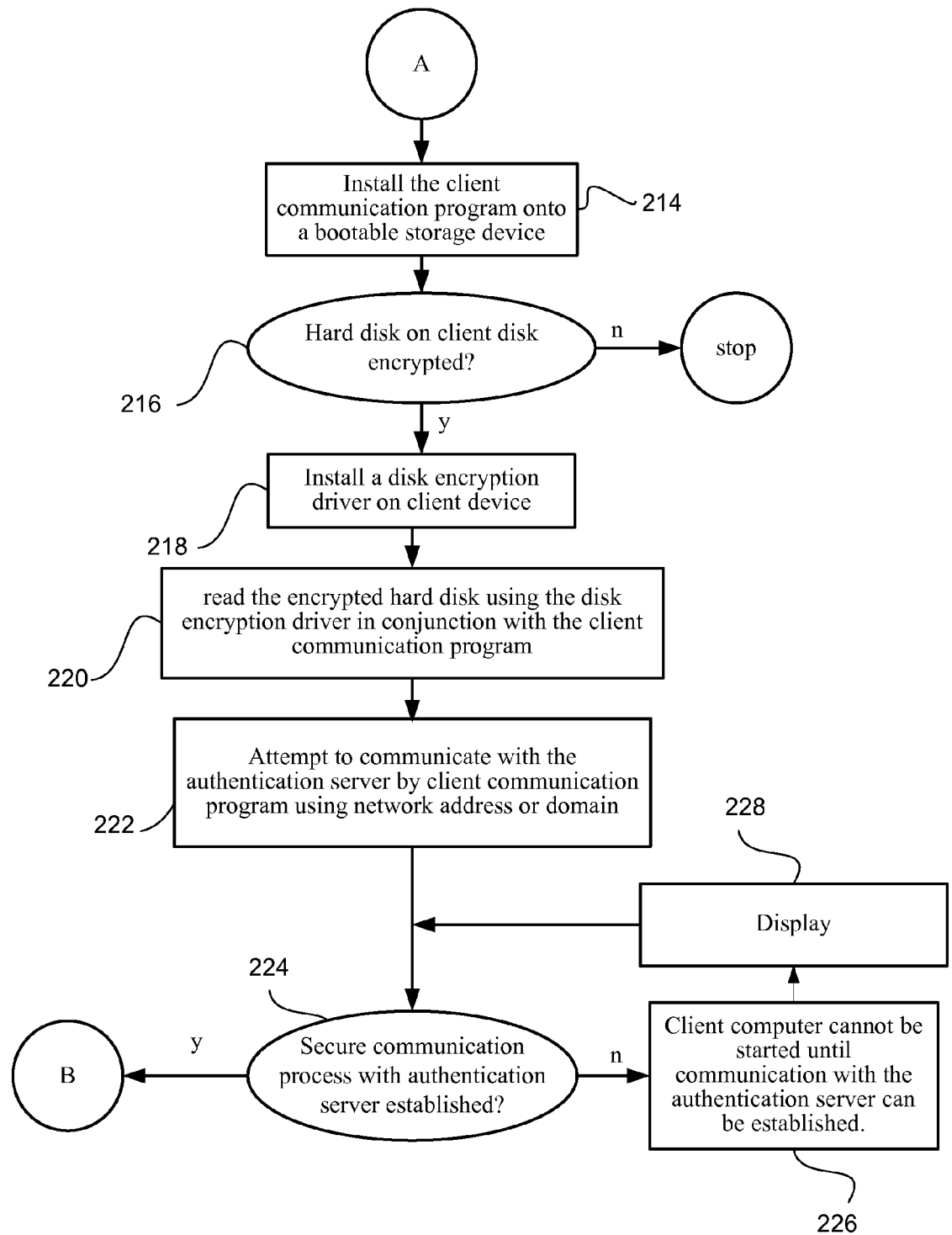
Figure 8:
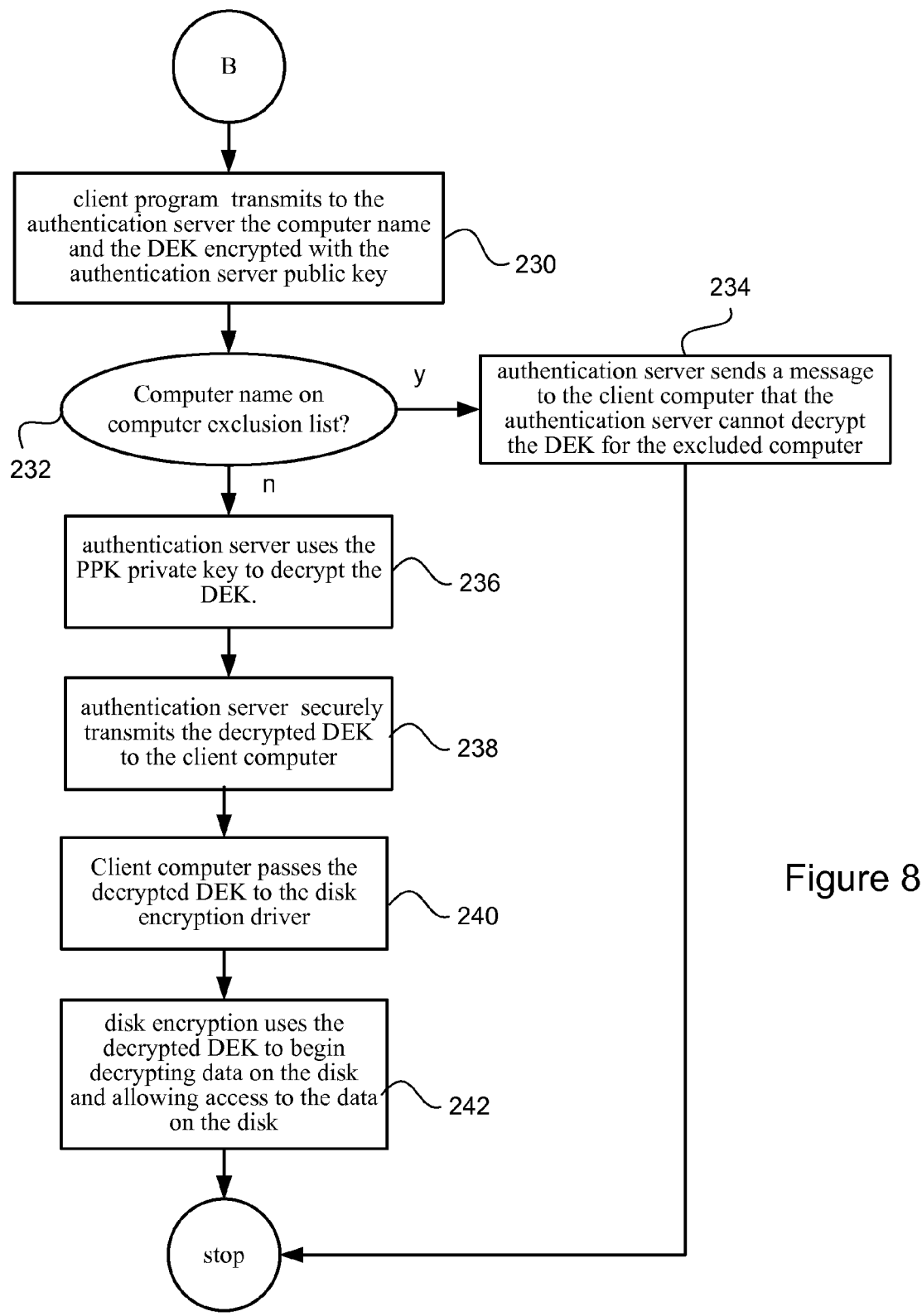

FIGS. 6-8 illustrate a process 200 in accordance with an embodiment of the invention. The process 200 begins at 202 by installing the authentication software on an authentication server. Once installed, the authentication software creates a public/private key pair (PPK) at 204 having a public key portion and a private key portion. At 206, a client communication program that enables communication between the client computer and the authentication server is created. In the described embodiment, during the creation of the communication program, the public key portion of the PPK is embedded in the client communication program at 208 whereas the private key portion of the PPK remains on the authentication server. At 210, a location identifier (i.e., a network address, domain name, etc.) of the authentication server is embedded into the client communication program and at 212, a client computer exclusion list is created that provides an identification of those client computers that are to be excluded from the authentication process carried out by the authentication server. It should be noted that in some embodiments, the client computer exclusion list is dynamic in nature and, in those cases, the addition or deletion of names on the list requires a server administrator, for example, to enter the computer names of any computer that should be denied access to the authentication process.

Referring now to FIG. 7, the client communication program is ready to be installed on any of a number of client computers at 214 using, for example, a bootable storage device such as a CDROM that can be booted on a client computer. Once installed on a target client computer, a determination is made whether or not a main memory device (such as a hard drive) on the target client computer is encrypted at 216. In a particular embodiment, a determination of whether a given file is encrypted or not is performed by reading and comparing the first 22 bytes of the file in order to ascertain whether a particular key tag (such as <PCGEncryptedData-File>) is present or not.

If the hard disk is not encrypted, then there is no need for further processing according to the invention, and the process 200 stops. On the other hand, if it is determined that the hard disk is encrypted, then a disk encryption driver that encrypts and decrypts the data on the hard disk is installed on the target client computer at 218. At 220, the disk encryption driver is used in conjunction with the client communication program to read the encrypted hard disk and at 222 the client communication program attempts to establish communication with the authentication server over a secure channel (wired, wireless, etc.) using the computer identifier (i.e., network address or domain) that was previously embedded in the client communication program. If at 224 it is determined that a secure connection has not been established, then the target client computer can not be started at 226 and the client computer will display a message that says the computer cannot be started until communication with the authentication server can be established at 228.

Referring now to FIG. 8, once the secure communication channel has been established at 224, the client communication program transmits at 230 the computer identifier (such as the computer name) of the client computer and the DEK encrypted with the authentication server public key. Once received at the authentication server, the authentication server will determine if the computer name for the client computer is listed in the computer exclusion list at 232. If it is determined that the target client computer is on the excluded list, the authentication server will send a message to the client computer that the authentication server cannot decrypt the DEK for the excluded computer at 234. If, however, the client computer is not on the computer exclusion list, the authentication server will use the PPK private key to decrypt the DEK at 236. At 238, the authentication server will then securely transmit the decrypted DEK to the client computer. When the client computer receives the decrypted DEK, the client computer will pass the decrypted DEK to the disk encryption driver at 240 that will use the DEK to begin decrypting data on the disk and allow access to the data on the disk at 242.

In this way the invention offers encryption anywhere on a given computer by encrypting and decrypting files which reside on local disk storage, removable media storage, and/or network shares thereby covering all file accesses that a user can perform from a given system. In one embodiment, the encrypted file format is stored in an XML based layout that allows for an easily extensible form to store metadata pertaining to the file and the policy for accessing the file. In addition to being in XML form on disk, the file is optionally Base64 encoded that can be selected through policy or is defined in the XML header for already encrypted files. It should be noted, however, that the performance impact of the encoding and decoding to the Base64 format is quite high and not recommended for large files or files requiring direct, non-cached access.

Figure 9:
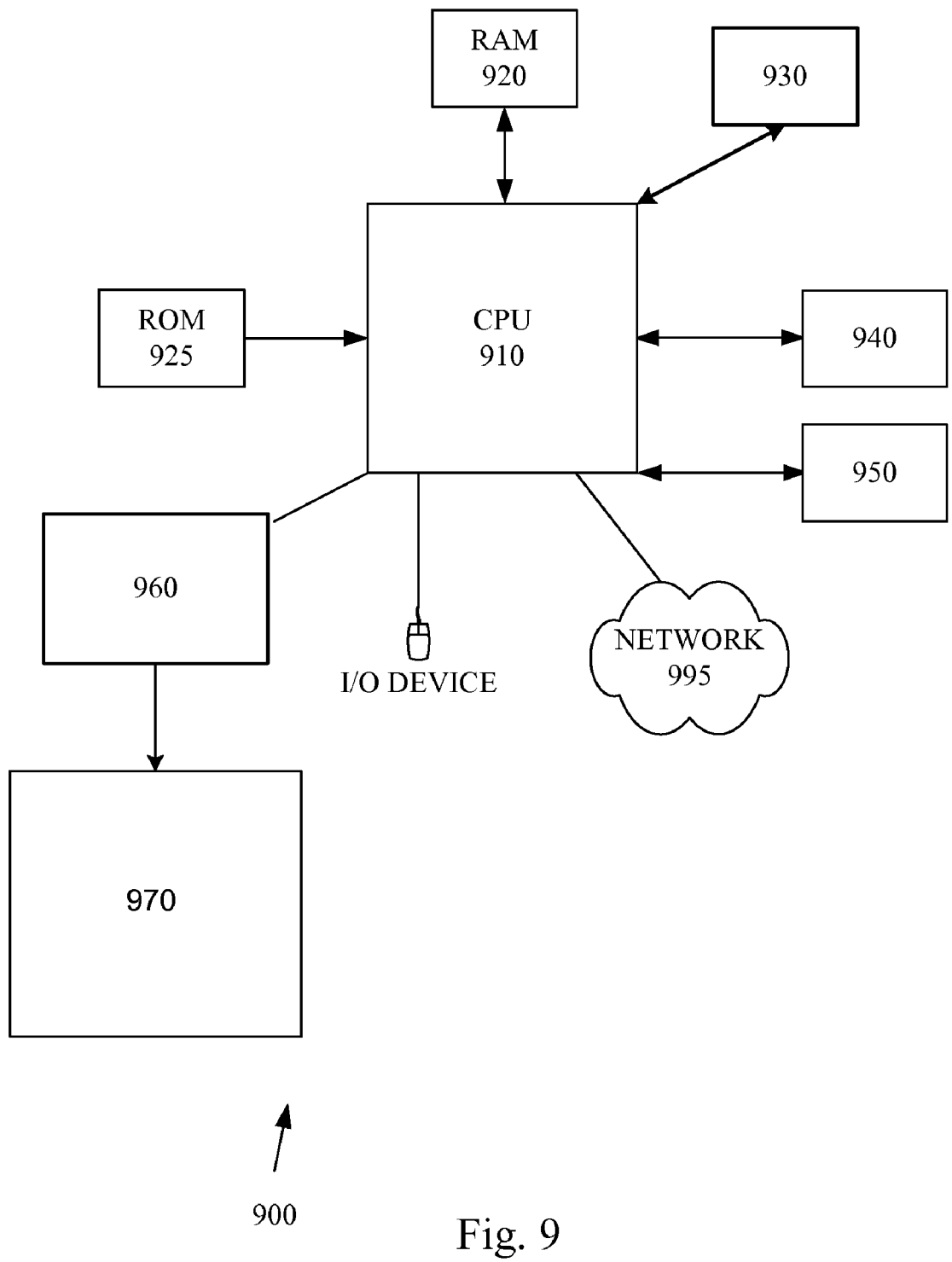
FIG. 9 illustrates a computer system employed to implement the invention.

FIG. 9 illustrates a computer system 900 employed to implement the invention. Computer system 900 is only an example of a graphics system in which the present invention can be implemented. Computer system 900 includes central processing unit (CPU) 910, random access memory (RAM) 920, read only memory (ROM) 925, one or more peripherals 930, graphics controller 960, primary storage devices 940 and 950, and an optional display unit 970. As is well known in the art, ROM acts to transfer data and instructions uni-directionally to the CPUs 910, while RAM is used typically to transfer data and instructions in a bi-directional manner. CPUs 910 may generally include any number of processors. Both primary storage devices 940 and 950 may include any suitable computer-readable media.

CPUs 910 are also coupled to one or more input/output devices 990 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 910 optionally may be coupled to a computer or telecommunications network e.g., an Internet network or an intranet network, using a network connection as shown generally at 995. With such a network connection, it is contemplated that the CPUs 910 might receive information from the network or might output information to the network in the course of performing the above-described method steps. Such information, which is often represented as a sequence of instructions to be executed using CPUs 910, may be received from and outputted to the network, for example, in the form of a computer data signal embodied in a carrier wave. The above-described devices and materials will be familiar to those of skill in the computer hardware and software arts.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, optical and data storage devices. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that encryption and user accounts are used to provide controlled distribution of content. The controlled distribution can not only restrict unauthorized access to the content but also limit usage rights to the content by authorized users. Another advantage of the invention is that file-specific encryption can be utilized at a server-side, while user-specific encryption can be used at a client-side. Another advantage of the invention is that files can be commonly encrypted at the server-side for storage and download to any user that has been authorized.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of remotely administering data encryption in a computing system that includes an authentication server and at least one client computer that includes a communication component and a data storage device for storing encrypted data, the computer-implemented method comprising:
    requesting, by the communication component, communication with the authentication server when start up of the client computer is initiated;
    determining, by the authentication server, if the client computer on which the encrypted data is stored is an authorized client computer;
    passing an encrypted data storage key for decrypting the encrypted data, from the communication component of the client computer to the authentication server if the client computer is authorized;
    not allowing, by the communication component, the start up of the client computer to complete successfully if the client computer is not authorized or communication with the authentication server cannot be established;
    decrypting the encrypted data storage key by the authentication server;
    passing, by the authentication server, the decrypted data storage key to the client computer; and
    using the decrypted data storage key, by the client computer, to access the encrypted data on the data storage device.

2. A method as recited in claim 1, further comprising:
    at the authentication server, providing a list of excluded client computers that identify those client computers that are not authorized;
    querying the list of excluded client computers for an identifier corresponding to the client computer; and
    if the identifier corresponding to the client computer is not on the list of excluded client computers, then authorizing the client computer.

3. A method as recited in claim 1, further comprising:
    at the authentication server, generating a private key and a public key;
    instantiating a communication program;
    embedding the public key in the communication program;
    passing the communication program to the client computer; and
    installing the communication program on the client computer.

4. A method as recited in claim 3, further comprising:
    at the client computer, generating the encrypted data stored on the client computer using a data storage key; and
    creating the encrypted data storage key by encrypting the data storage key using the public key embedded in the communication program.

5. A computing system, comprising:
    an authentication server, and at least one client computer that includes a communication component and a data storage device for storing encrypted data, wherein said computing system is operable to:
        request, by the communication component, communication with the authentication server when start up of the client computer is initiated;
        determine, by the authentication server, if the client computer on which the encrypted data is stored is an authorized client computer;
        pass an encrypted data storage key for decrypting the encrypted data, from the communication component of the client computer to the authentication server if the client computer is authorized;
        not allow, by the communication component, the start up of the client computer to complete successfully if the client computer is not authorized or communication with the authentication server cannot be established;

decrypt the encrypted data storage key by the authentication server;

pass, by the authentication server, the decrypted data storage key to the client computer; and use the decrypted data storage key, by the client computer, to access the encrypted data on the data storage device.

6. A computing system as recited in claim 5, further operable to:

provide a list of excluded client computers that identify those client computers that are not authorized;

query the list of excluded client computers for an identifier corresponding to the client computer; and authorize the client computer if the identifier corresponding to the client computer is not on the list of excluded client computers.

7. A computing system as recited in claim 5, further operable to:

generate a private key and a public key;

instantiate a communication program;

embed the public key in the communication program;

pass the communication program to the authorized client computer; and install the communication program on the authorized client computer.

8. A computing system as recited in claim 7, further operable to:

at the client computer, generate the encrypted data stored on the client computer using a data storage key; and create the encrypted data storage key by encrypting the data storage key using the public key embedded in the communication program.

9. A non-transitory computer-readable storage medium that stores executable computer code for remotely administering data encryption in a computing system that includes an authentication server and at least one client computer that includes a communication component and a data storage device for storing encrypted data, comprising:

executable computer code for requesting, by the communication component, communication with the authentication server when start up of the client computer is initiated;

executable computer code for determining, by the authentication server, if the client computer on which the encrypted data is stored is an authorized client computer;

executable computer code for passing an encrypted data storage key for decrypting the encrypted data, from the communication component of the client computer to the authentication server if the client computer is authorized;

executable computer code for not allowing, by the communication component, the start up of the client computer to complete successfully if the client computer is not authorized or communication with the authentication server cannot be established;

executable computer code for decrypting the encrypted data storage key by the authentication server;

executable computer code for passing, by the authentication server, the decrypted data storage key to the client computer;

executable computer code for using the decrypted data storage key, by the client computer, to access the encrypted data on the data storage device.

10. The computer-readable storage medium as recited in claim 9, further comprising:

executable computer code for providing a list of excluded client computers that identify those client computers that are not authorized;

executable computer code for querying the list of excluded client computers for an identifier corresponding to the client computer; and executable computer code for authorizing the client computer if the identifier corresponding to the client computer is not on the list of excluded client computers.

11. The computer-readable storage medium as recited in claim 9, further comprising:

executable computer code for generating a private key and a public key;

executable computer code for instantiating a communication program;

executable computer code for embedding the public key in the communication program;

executable computer code for passing the communication program to the authorized client computer; and executable computer code for installing the communication program on the authorized client computer.

12. The computer-readable storage medium as recited in claim 11, further comprising:

at the client computer, executable computer code for generating the encrypted data stored on the client computer using a data storage key; and executable computer code for creating the encrypted data storage key by encrypting the data storage key using the public key embedded in the communication program.

13. A method, comprising:

at a client computer, receiving a communication program from an authentication server that includes a public key, and a network address of the authentication server embedded in the communication program;

encrypting data using a data storage key;

encrypting the data storage key using the public key received from the authentication server;

establishing a secure communication link with the authentication server by the communication program using the network address of the authentication server only when the client computer is an authorized client computer;

sending the encrypted data storage key to the authentication server through the secure communication link;

receiving from the authentication server a decrypted copy of the data storage key through the secure communication link; and decrypting at least a portion of the encrypted data using the decrypted copy of the data storage key received from the authentication server.

14. The method as recited in claim 13, further comprising:

at the authentication server, receiving from the client computer an identifier corresponding to the client computer;

querying a list of excluded computers for the identifier corresponding to the client computer; and authorizing the client computer when the client computer is not on the list of excluded client computers.

15. The method as recited in claim 13, further comprising:

at the authentication server, authorizing the client computer when the client computer is secured by a designated firewall.

16. The method as recited in claim 13, further comprising:
at the authentication server,
generating the public key and a private key as a pair;
embedding the public key in the communication program and sending to the client computer the communication program;
receiving from the client computer the encrypted data storage key;
decrypting the encrypted data storage key using the private key; and
sending to the client computer the decrypted copy of the data storage key only when the client computer is an authorized client computer.

17. The method as recited in claim 13, further comprising:
at the client computer, encrypting the data using the data storage key at a sector level of a storage medium of the client computer; and
storing the encrypted data storage key to at least one of the storage medium of the client computer and a local storage device connected to the client computer.

18. A computing system, comprising:
a client computer having a processor adapted to execute instructions, the instructions when executed by the processor causing the client computer to:
receive a communication program from an authentication server that includes a public key, and a network address of the authentication server embedded in the communication program;
encrypt data using a data storage key;
encrypt the data storage key using the public key received from the authentication server;
establish a secure communication link between the client computer and the authentication server by the communication program using the network address of the authentication server only when the client computer is an authorized client computer;
send the encrypted data storage key to the authentication server through the secure communication link;
receive from the authentication server a decrypted copy of the data storage key through the secure communication link only when the client computer is an authorized client computer; and
decrypt at least a portion of the encrypted data using the decrypted copy of the data storage key received from the authentication server.

19. The computing system as recited in claim 18, further comprising:
the authentication server operable to:
receive from the client computer an identifier corresponding to the client computer;
query a list of excluded computers for the identifier corresponding to the client computer; and
authorize the client computer when the client computer is not on the list of excluded client computers.

20. The computing system as recited in claim 18, further comprising:
the authentication server operable to:
authorize the client computer when the client computer is secured by a designated firewall.

21. The computing system as recited in claim 18, further comprising:
the authentication server operable to:
generate the public key and a private key as a pair;
embed the public key in the communication program and send to the client computer the communication program;
receive from the client computer the encrypted data storage key;
decrypt the encrypted data storage key using the private key; and
send to the client computer the decrypted copy of the data storage key only when the client computer is an authorized client computer.

22. The computing system as recited in claim 18, further comprising:
the client computer operable to:
encrypt the data using the data storage key at a sector level of a storage medium of the client computer; and
store the encrypted data storage key to at least one of the storage medium of the client computer and a local storage device connected to the client computer.

23. A non-transitory computer-readable storage medium that stores executable computer code comprising:
at a client computer,
executable computer code for receiving a communication program from an authentication server that includes a public key, a network address of the authentication server embedded in the communication program;
executable computer code for encrypting data using a data storage key;
executable computer code for encrypting the data storage key using the public key received from the authentication server;
executable computer code for establishing a secure communication link with the authentication server by the communication program using the network address of the authentication server only when the client computer is an authorized client computer;
executable computer code for sending the encrypted data storage key to the authentication server through the secure communication link;
executable computer code for receiving from the authentication server a decrypted copy of the data storage key through the secure communication link;
executable computer code for decrypting at least a portion of the encrypted data using the decrypted copy of the data storage key received from the authentication server.

24. The computer-readable storage medium as recited in claim 23, further comprising:
at the authentication server, executable computer code for receiving from the client computer an identifier corresponding to the client computer;
executable computer code for querying a list of excluded computers for the identifier corresponding to the client computer; and
executable computer code for authorizing the client computer when the client computer is not on the list of excluded client computers.

25. The computer-readable storage medium as recited in claim 23, further comprising:
at the authentication server, executable computer code for authorizing the client computer when the client computer is secured by a designated firewall.

26. The computer-readable storage medium as recited in claim 23, further comprising:
at the authentication server,
executable computer code for generating the public key and a private key as a pair;
executable computer code for embedding the public key in the communication program and sending to the client computer the communication program;
executable computer code for receiving from the client computer the encrypted data storage key;

executable computer code for decrypting the encrypted data storage key using the private key; and executable computer code for sending to the client computer the decrypted copy of the data storage key only when the client computer is an authorized client computer.

27. The computer-readable storage medium as recited in claim 23, further comprising:

at the client computer, executable computer code for encrypting the data using the data storage key at a sector level of a storage medium of the client computer; and executable computer code for storing the encrypted data storage key to at least one of the storage medium of the client computer and a local storage device connected to the client computer.

* * * * *